(12) United States Patent
Jung

(10) Patent No.: US 8,707,115 B2
(45) Date of Patent: Apr. 22, 2014

(54) MICRO CONTROLLER, DRIVING METHOD THEREOF AND DISPLAY DEVICE USING THE SAME

(75) Inventor: Byunggeun Jung, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 343 days.

(21) Appl. No.: 13/240,405

(22) Filed: Sep. 22, 2011

(65) Prior Publication Data

US 2012/0096315 A1    Apr. 19, 2012

(30) Foreign Application Priority Data

Oct. 13, 2010   (KR) .......................... 10-2010-0099614

(51) Int. Cl.
*G01R 31/28*   (2006.01)

(52) U.S. Cl.
USPC ........................... 714/726; 714/733; 714/734

(58) Field of Classification Search
USPC ......... 714/726, 724, 727, 279, 731, 733, 734, 714/30, 31, 27, 1–2
See application file for complete search history.

(56) References Cited

U.S. PATENT DOCUMENTS

| | | | | |
|---|---|---|---|---|
| 5,115,435 A | * | 5/1992 | Langford et al. | 714/727 |
| 7,496,809 B2 | * | 2/2009 | Dubey | 714/718 |
| 8,453,024 B2 | * | 5/2013 | Whetsel | 714/726 |
| 2008/0244341 A1 | * | 10/2008 | Yoshihara | 714/726 |

FOREIGN PATENT DOCUMENTS

KR    100280481 B1    11/2000
KR    1020010055156 A    7/2001

OTHER PUBLICATIONS

Office Action issued in corresponding Korean Patent Application No. 10-2010-0099614, mailed Nov. 27, 2012.

* cited by examiner

*Primary Examiner* — Christine Tu
(74) *Attorney, Agent, or Firm* — Brinks Gilson & Lione

(57) ABSTRACT

A micro controller includes an input and output unit having a reset terminal, a plurality of input terminals, and a test enable terminal, a test mode setting unit which allocates a first input terminal of the plurality of input terminals to a test clock terminal and allocates the remaining N input terminals to L test terminals, in response to a signal output from the input and output unit, and a processor which controls the input and output unit and the test mode setting unit. The test mode setting unit includes M flip-flops which receives a test clock signal from the first input terminal, a test signal from the N input terminals, and a test enable signal from the test enable terminal, and a decoder which decodes a signal output from the M flip-flops and determines whether or not to allocate the N input terminals to the L test terminals.

14 Claims, 4 Drawing Sheets

MICRO CONTROLLER, DRIVING METHOD THEREOF AND DISPLAY DEVICE USING THE SAME

This application claims the priority and the benefit under 35 U.S.C. §119(a) on Patent Application No. 10-2010-0099614 filed in Republic of Korea on Oct. 13, 2010 the entire contents of which are hereby incorporated by reference.

BACKGROUND

1. Field of the Invention

This document relates to a micro controller, a driving method thereof, and a display device using the same.

2. Discussion of the Related Art

A micro controller is a device which integrates generic arithmetic and logic elements with additional elements such as a rewritable memory for storing data, a read only memory such as a flash for storing codes, an EEPROM for continuously storing data, peripheral devices, and an input and output interface. The micro controller is used in automatic control products such as display devices, automobile engine control systems, remote controllers, office devices, electronic devices, power-supply equipment, and toys.

After an entire system is manufactured, the micro controller is provided with a plurality of separate test mode selection pins (hereinafter, referred to as "test pins") used to efficiently test the system, and each test mode is set by the combination of the pins.

However, the micro controller in the related art causes increase in test costs due to increase in patterns and package pins in the layout of a printed circuit board constituting the system. In other words, input and output pins are separately added to the micro controller in the related art in order to generate many test modes, and thus the costs are increased due to the addition of the pins.

BRIEF SUMMARY

According to an exemplary embodiment of this document, there is provided a micro controller including an input and output unit having a reset terminal, a plurality of input terminals, and a test enable terminal; a test mode setting unit configured to allocate a first input terminal which is one of the plurality of input terminals to a test clock terminal and allocate the remaining N (where N is an integer equal to or more than 1) input terminals of the plurality of input terminals to L (where L is an integer equal to or more than 1) test terminals, in response to a signal output from the input and output unit; and a processor configured to control the input and output unit and the test mode setting unit, wherein the test mode setting unit includes M (where M is an integer equal to or more than 2) flip-flops configured to receive a test clock signal from the first input terminal, receive a test signal from the N input terminals, and receive a test enable signal from the test enable terminal; and a decoder configured to decode a signal output from the M flip-flops and determine whether or not to allocate the N input terminals to the L test terminals.

According to an exemplary embodiment of this document, there is provided a driving method of a micro controller including a test clock allocating step of allocating one of a plurality of input terminals to a test clock terminal; a test terminal allocating step of allocating the remaining N (where N is an integer equal to or more than 1) input terminals of the plurality of input terminals to L (where L is an integer equal to or more than 1) test terminals; a test mode preparing step of preparing for entering a test mode by inputting the same signal to a test enable terminal and a reset terminal; a test mode performing step of generating test protocols by reversing a test enable signal input to the test enable terminal and performing tests using the L test terminals; and a test mode finishing step of stopping the generation of the test protocols by reversing a reset signal input to the reset terminal.

According to an exemplary embodiment of this document, there is provided a display device including a display panel; panel drivers configured to supply data signals and scan signals to the display panel; and a micro controller configured to control the panel drivers, wherein the micro controller includes an input and output unit having a reset terminal, a plurality of input terminals, and a test enable terminal; a test mode setting unit configured to allocate a first input terminal which is one of the plurality of input terminals to a test clock terminal and allocate the remaining N (where N is an integer equal to or more than 1) input terminals of the plurality of input terminals to L (where L is an integer equal to or more than 1) test terminals, in response to a signal output from the input and output unit; and a processor configured to control the input and output unit and the test mode setting unit, and wherein the test mode setting unit includes M (where M is an integer equal to or more than 2) flip-flops configured to receive a test clock signal from the first input terminal, receive a test signal from the N input terminals, and receive a test enable signal from the test enable terminal; and a decoder configured to decode a signal output from the M flip-flops and determine whether or not to allocate the N input terminals to the L test terminals.

BRIEF DESCRIPTION OF THE DRAWINGS

The accompany drawings, which are included to provide a further understanding of the invention and are incorporated on and constitute a part of this specification illustrate embodiments of the invention and together with the description serve to explain the principles of the invention.

DETAILED DESCRIPTION OF THE DRAWINGS AND THE PRESENTLY PREFERRED EMBODIMENTS

Reference will now be made in detail embodiments of the invention examples of which are illustrated in the accompanying drawings.

Hereinafter, embodiments of this document will be described with reference to the accompanying drawings.

Micro Controller

Figure 1:
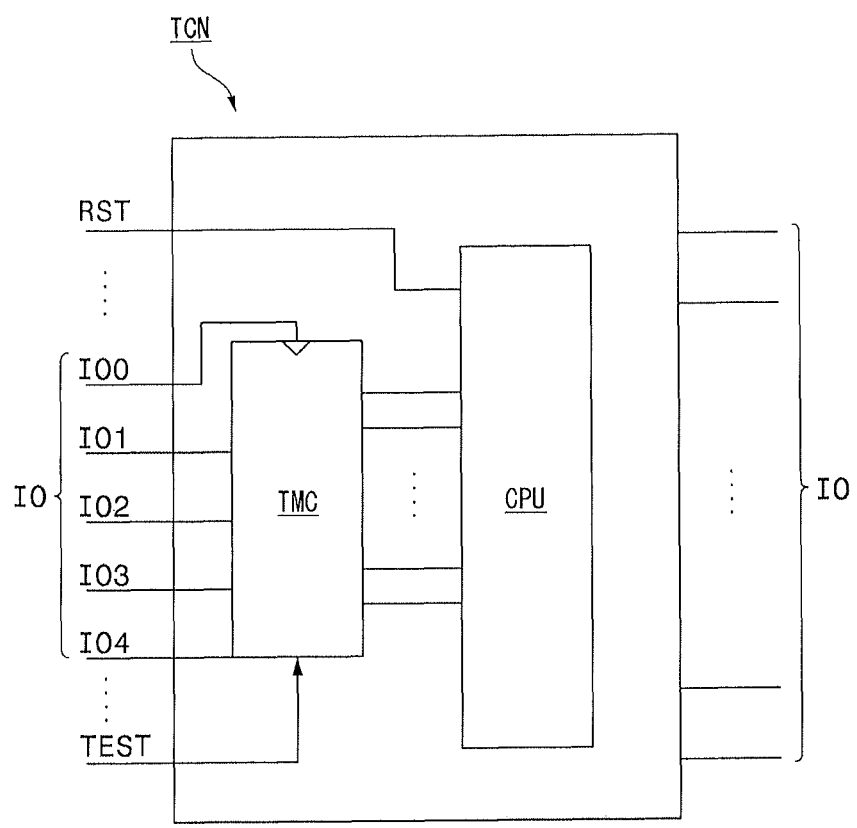
FIG. 1 is a schematic configuration diagram of a micro controller according to an embodiment of this document.

FIG. 1 is a schematic configuration diagram of a micro controller according to an embodiment of this document.

As shown in FIG. 1, the micro controller TCN includes an input and output unit IO, a test mode setting unit TMC, and a processor CPU.

The input and output unit IO processes signals output from an external device or outputs signals which have been processed inside. The input and output unit IO includes a reset terminal RST, a plurality of input terminals IO0 to IO4, and a test enable terminal TEST.

In response to signals from the input and output unit IO, the test mode setting unit TMC allocates the first input terminal IO0 of the input terminals IO0 to IO4 to a test clock terminal, and allocates the remaining N (where N is an integer equal to or more than 1) input terminals IO1 to IO4 to L (where L is an integer equal to or more than 1) test terminals.

The processor CPU controls the input and output unit IO such that the signal from the external device is processed to be converted into a new signal and the converted signal is output from the input and output unit IO. In addition, the processor CPU controls the input and output unit IO such that the terminals included in the input and output unit IO are operated in a test mode based on signals supplied from the test mode setting unit TMC.

According to an embodiment, the micro controller TCN controls the input terminals IO0 to IO4 to be operated in a normal mode or in a test mode in response to the signals from the input and output unit IO and can thereby share the input terminals IO0 to IO4 so as to reduce the number of the test terminals. Hereinafter, the test mode setting unit TMC included in the micro controller TCN will be described in detail.

Figure 2:
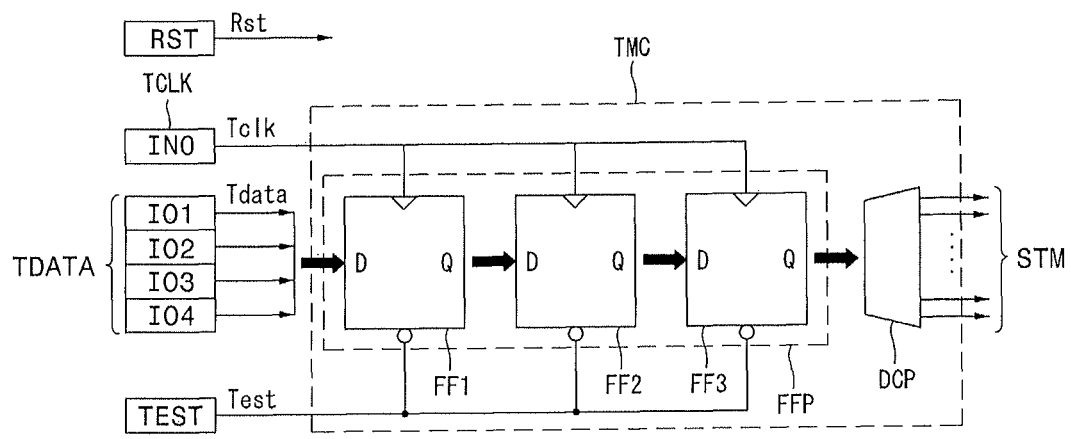
FIG. 2 is a schematic configuration diagram of a test mode setting unit in FIG. 1.
Figure 3:
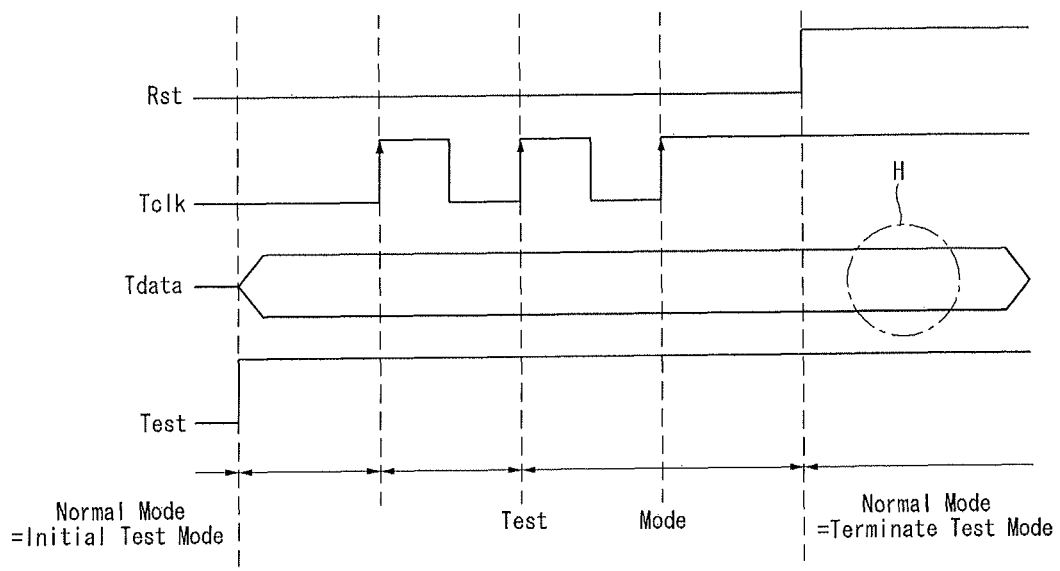
FIG. 3 is a waveform diagram illustrating an operation of the test mode setting unit shown in FIG. 2.

FIG. 2 is a schematic configuration diagram of the test mode setting unit shown in FIG. 1, and FIG. 3 is a waveform diagram illustrating an operation of the test mode setting unit shown in FIG. 2.

As shown in FIGS. 1 and 2, the test mode setting unit TMC includes M (where M is an integer equal to or more than 2) flip-flops FFP and a decoder DCP.

The M flip-flops FFP receive a test clock signal from the first input terminal IO0, receives test signals from the N input terminals IO1 to IO4, and receives a test enable signal from the test enable terminal TEST. The M flip-flops FFP according to the embodiment include a first flip-flop FF1 which receives a test signal from the N input terminals IO1 to IO4, a second flip-flop FF2 which receives the test signal latched in the first flip-flop FF1, and a third flip-flop FF3 which receives the test signal latched in the second flip-flop FF2. The first to third flip-flops FF1 to FF3 may be constituted by a D flip-flop which processes signals from the four input terminals IO1 to IO4 but is not limited thereto. The first to third flip-flops FF1 to FF3 are connected to each other so as to receive the test clock signal from the first input terminal IO0 which is selected as the test clock terminal TCLK and receive the test enable signal from the test enable terminal TEST.

The decoder DCP decodes the test signal output from the M flip-flops FFP and determines whether or not to allocate the N input terminals IO1 to IO4 to the L test terminals TDATA. Since the first to third flip-flops FF1 to FF3 process a 4-bit signal output from the four input terminals IO1 to IO4, the decoder DCP may be constituted by a 4-to-16 decoder so as to select sixteen modes, but is not limited thereto.

When the allocation to the test clock terminal TCLK and the L test terminals TDATA is completed, and the same signal, for example, a logic low signal 0 is input to the test enable terminal TEST and the reset terminal RST, the test mode setting unit TMC prepares the L test terminals TDATA for entering the test mode. When the signal input to the test enable terminal TEST is reversed from the logic low signal 0 to a logic high signal 1, test protocols STM are generated so as to perform tests using the L test terminals TDATA. The test protocols STM are signals which are regulated to be used in the processor CPU together and may be formed by 10000 . . . , 01000 . . . , 00100 . . . , 0010 . . . , 00000 . . . and the like, but are not limited thereto. When receiving the test protocols STM from the test mode setting unit TMC, the processor CPU controls the L test terminals TDATA to enter a specific test mode.

More specifically, in FIG. 3, the test mode setting unit TMC allows the L test terminals TDATA to be operated in the normal mode for input and output of typical signals and in the test mode for input and output of test signals.

First, when the logic low signal 0 is input to the test enable terminal TEST and the reset terminal RST, the test mode setting unit TMC initializes the M flip-flops FFP to prepare for the test mode. Here, if the test enable signal Test input to the test enable terminal TEST and the reset signal Rst input to the reset terminal RST are in the logic low signal 0 state, the micro controller TCN is operated in the normal mode and simultaneously enters an initial test mode. The micro controller TCN is in a static state of stopping the operation at the duration where the reset signal Rst is in the logic low signal 0 state, and thus the application of the test protocols has no influence on the operation of the micro controller TCN.

Thereafter, when the test enable signal Test input to the test enable terminal TEST is changed from the logic low signal 0 to the logic high signal 1 in the state where the reset signal Rst input to the reset terminal RST is maintained as the logic low signal 0, the test mode setting unit TMC is activated so as to perform the test mode.

At this time, in the test mode setting unit TMC, the test clock signal Tclk input to the test clock terminal TCLK is at least twice reversed from the logic low signal 0 to the logic high signal 1 and then is input to the M flip-flops FFP. Also, the test signal Tdata input via the test terminal TDATA is latched in the M flip-flops FFP and maintains its value, and when the value latched in the M flip-flops FFP is decoded by the decoder DCP, $2^n$ test modes are set. Here, since the M flip-flops FFP include the three flip-flops FF1 to FF3, the test clock signal Tclk is divided into three test clock signals which are input to the three flip-flops FF1 to FF3, and the test mode is set after the three test clock signals are input thereto. Thus, if the flip-flops FFP include K (where K is an integer equal to or more than 1) flip-flops, it can be seen that the number of toggling of the test clock signals is K.

As above, when the test mode is performed in order to use the test terminal by sharing the N input terminals IO1 to IO4, if the reset signal Rst input to the reset terminal RST is reversed from the logic low signal 0 to the logic high signal 1, the test mode setting unit TMC stops the generation of the test protocols STM. When the test mode finishes in this way, the test mode setting unit TMC is operated in the normal mode.

In the micro controller TCN according to the embodiment, even if the test protocols STM stops being generated, the test signal Tdata is maintained to be high by the M flip-flops FFP included in the test mode setting unit TMC, and thus the test clock terminal TCLK and the test terminals TDATA can be put to other uses. Therefore, the micro controller TCN according to the embodiment shares a portion of the input and output unit IO, but the sharing is possible while preventing data interference between the normal mode and the test mode by the use of the test protocols as described above.

Driving Method of Micro Controller

Figure 4:
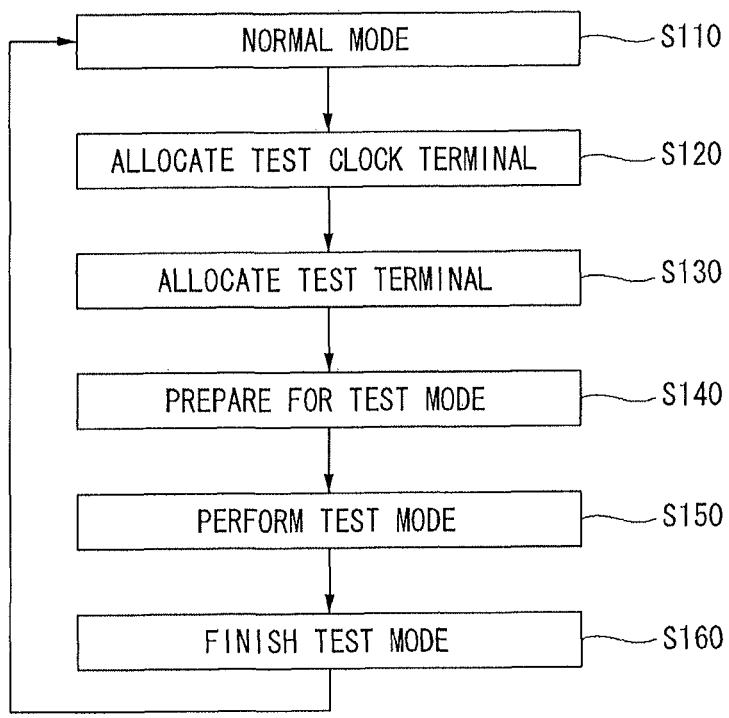
FIGS. 4 and 5 are diagrams illustrating a driving method of the micro controller according to an embodiment of this document.
Figure 5:
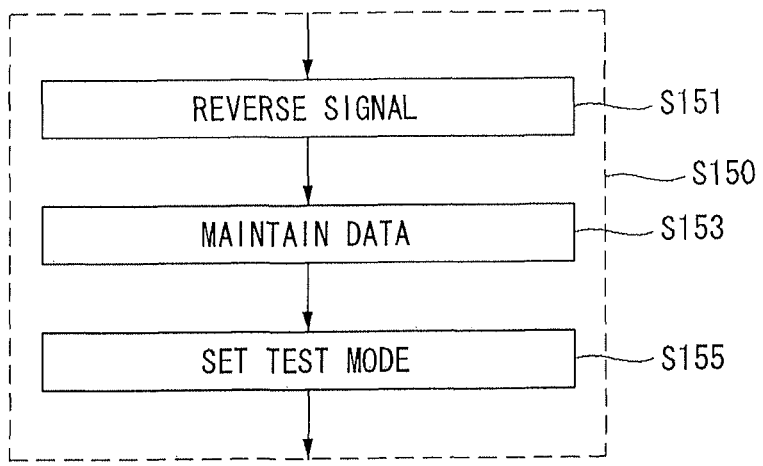

FIGS. 4 and 5 are diagrams illustrating a driving method of the micro controller according to an embodiment of this document.

With reference to FIGS. 1 to 5, the driving method of the micro controller will be described.

First, since the micro controller TCN is operated in the normal mode (S110), a test clock terminal allocating step S120 is performed in which the first input terminal IO0 which is one of a plurality of input terminals IO0 to IO4 is allocated to the test clock terminal TCLK.

Next, a test terminal allocating step S130 is performed in which the remaining N (where N is an integer equal to or more than 1) input terminals IO1 to IO4 are allocated to L (where L is an integer equal to or more than 1) test terminals TDATA.

Next, a test mode preparing step S140 is performed in which the same signal is input to the test enable terminal TEST and the reset terminal RST so as to prepare for entering the test mode.

In the test mode preparing step S140, the M flip-flops FFP are initialized by inputting the logic low signal 0 to the test enable terminal TEST and the reset terminal RST.

Next, a test mode performing step S150 is performed in which the test protocols STM are generated by reversing the test enable signal Test input to the test enable terminal TEST and a test is carried out by the use of the L test terminals TDATA.

In the test mode performing step S150, the logic low signal 0 input to the reset terminal RST is maintained, and the test enable signal Test input to the test enable terminal TEST is changed to the logic high signal 1. The test mode performing step S150 includes a signal reversing step S151 in which the test clock signal Tclk input to the test clock terminal TCLK is at least twice reversed from the logic low signal 0 to the logic high signal 1 and then is input to the M (where M is an integer equal to or more than 2) flip-flops FFP included in the test mode setting unit TMC, a data maintaining step S153 in which the test signal Tdata input via the L test terminals TDATA is latched in the M flip-flops FFP and maintains its value, and a test mode setting step S155 in which the value latched in the M flip-flops FFP is decoded by the decoder DCP, and thus $2^n$ test modes are set.

Next, a test mode finishing step S160 is performed in which the reset signal Rst input to the reset terminal RST is reversed to stop the generation of the test protocols STM, and thereby the micro controller TCN is operated in the normal mode S110.

In the above description, the test clock allocating step S120, the test terminal allocating step S130, the test mode preparing step S140, and the test mode performing step S150 are performed when the signal input to the reset terminal is in the logic low signal state.

Display Device

Figure 6:
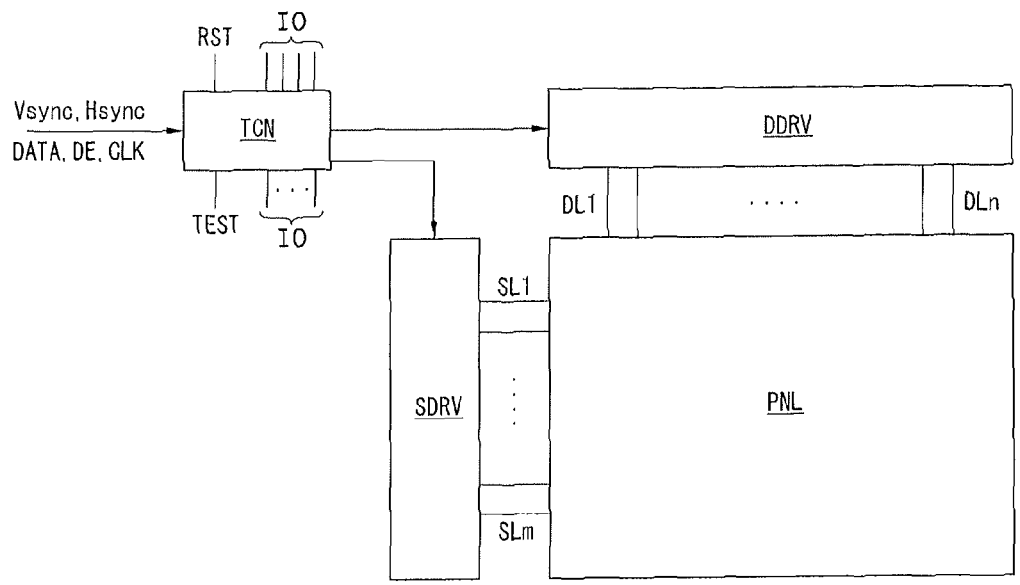
FIG. 6 is a schematic configuration diagram of a display device according to an embodiment of this document.
Figure 7:
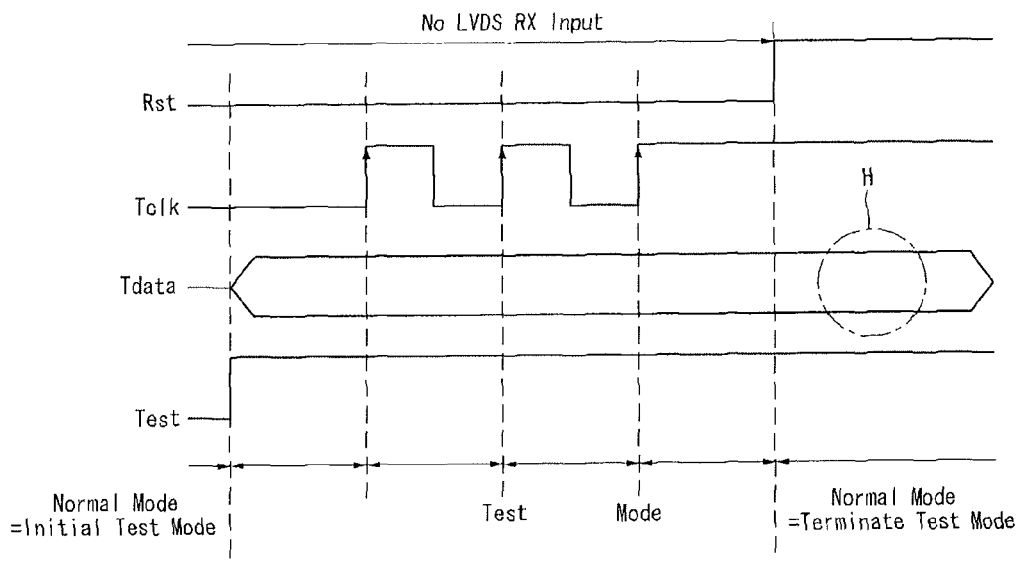
FIG. 7 is a waveform diagram illustrating an operation of the micro controller which drives the display device shown in FIG. 6.

FIG. 6 is a schematic configuration diagram of a display device according to an embodiment of this document, and FIG. 7 is a waveform illustrating an operation of the micro controller which drives the display device shown in FIG. 6.

As shown in FIGS. 1, 2 and 6, the display device according to an embodiment of this document is provided with a display panel PNL, panel drivers DDRV and SDRV which supply data signals and scan signals the display panel PNL, and the micro controller TCN shown in FIGS. 1 and 2 which controls the panel drivers DDRV and SDRV.

The display panel PNL may be a liquid crystal display panel including a liquid crystal layer or an organic light emitting display panel including organic light emitting diodes, but is not limited thereto.

The panel drivers DDRV and SDRV include a data driver DDRV which supplies data signals to data lines DL1 to DLn connected to the display panel PNL, and a scan driver SDRV which supplies scan signals to scan lines SL1 to SLm connected to the display panel PNL. The data driver DDRV and the scan driver SDRV input the data signals DATA and the scan signals to the display panel PNL under the control of the micro controller TCN.

The micro controller TCN is supplied with a vertical synchronization signal Vsync, a horizontal synchronization signal Hsync, a data enable signal DE, clock signals CLK, and the data signals DATA, from an external device. The micro controller TCN controls operation timings of the data driver DDRV and the scan driver SDRV using the timing signals such as the vertical synchronization signal Vsync, the horizontal synchronization signal Hsync, the data enable signal DE, and the clock signals CLK. The micro controller TCN determines a frame period by counting the data enable signal DE of one horizontal period, and thus the vertical synchronization signal Vsync and the horizontal synchronization signal Hsync supplied from the external device may be omitted. Control signals generated by the micro controller TCN may include gate timing control signals GDC for controlling operation timings of the scan driver SDRV and data timing control signals DDC for controlling operation timings of the data driver DDRV. The gate timing control signals GDC include a gate start pulse GSP, gate shift clocks GSC, gate output enable signal GOE, and the like. The gate start pulse GSP is supplied to a gate drive IC (integrated circuit) which generates a first gate signal. The gate shift clocks GSC are commonly input to the gate drive ICs and shift the gate start pulse GSP. The gate output enable signal GOE controls outputs from the gate drive ICs. The data timing control signals DDC include a source start pulse SSP, source sampling clocks SSC, a source output enable signal SOE, and the like. The source start pulse SSP controls the data sampling start point in the data driver DDRV. The source sampling clocks control a sampling operation of data using a rising edge or a falling edge as a reference in the data driver DDRV. The source output enable signal SOE controls outputs from the data driver DDRV. The source start pulse SSP supplied to the data driver DDRV may be omitted according to data transmission methods.

The micro controller TCN according to the embodiment includes the input and output unit IO, the test mode setting unit TMC, and the processor CPU. The input and output unit IO processes signals output from an external device or outputs signals which have been processed inside. The input and output unit IO includes the reset terminal RST, a plurality of input terminals IO0 to IO4, and the test enable terminal TEST. In response to signals from the input and output unit IO, the test mode setting unit TMC allocates the first input terminal IO0 of the input terminals IO0 to IO4 to a test clock terminal, and allocates the remaining N (where N is an integer equal to or more than 1) input terminals IO1 to IO4 to L (where L is an integer equal to or more than 1) test terminals TDATA. The processor CPU controls the input and output unit IO such that the signal from the external device is processed to be converted into a new signal and the converted signal is output from the input and output unit IO. In addition, the processor CPU controls the input and output unit IO such that the terminals included in the input and output unit IO are operated in a test mode based on signals supplied from the test mode setting unit TMC.

In the micro controller TCN according to the embodiment, as shown in FIG. 7, when the test mode is performed, the reset signal Rst is in the logic low signal 0 at the duration No LVDS RX Input where an LVDS receiving signal transmitting data to the micro controller TCN is not input, but is not limited thereto.

According to the embodiment, the micro controller TCN controls the input terminals IO0 to IO4 to be operated in the normal mode or in the test mode in response to the signals from the input and output unit IO and can thereby share the input terminals IO0 to IO4 so as to reduce the number of the test terminals. Detailed description of the micro controller TCN has been made with reference to FIGS. 1 to 5.

As described above, there are provided the micro controller, the driving method thereof, and the display device using the same, in which the micro controller controls the input terminals to be operated in the normal mode or in the test mode in response to the signals from the input and output unit and can thereby share the input terminals so as to reduce the number of the test terminals. In addition, since only a single test enable terminal for inputting a test enable signal is formed, it is possible to manufacture a micro controller at low costs. According to the embodiment, it is possible to prevent increase in costs caused by the addition of pins, and it is possible to reduce test time and test costs since a test mode is set in a short time of several clocks. Further, since the micro controller is applicable to various semiconductor products, it is applicable to various kinds of electronic products such as automobile engine control systems, remote controllers, office devices, electronic devices, power equipment, and toys, in addition to display devices.

The foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

The invention claimed is:

1. A micro controller comprising:
an input and output unit having a reset terminal, a plurality of input terminals, and a test enable terminal;
a test mode setting unit configured to allocate a first input terminal which is one of the plurality of input terminals to a test clock terminal and allocate the remaining N, where N is an integer equal to or more than 1, input terminals of the plurality of input terminals to L, where L is an integer equal to or more than 1, test terminals, in response to a signal output from the input and output unit; and
a processor configured to control the input and output unit and the test mode setting unit,
wherein the test mode setting unit includes:
M, where M is an integer equal to or more than 2, flip-flops configured to receive a test clock signal from the first input terminal, receive a test signal from the N input terminals, and receive a test enable signal from the test enable terminal; and
a decoder configured to decode a signal output from the M flip-flops and to allocate the N input terminals to the L test terminals.

2. The micro controller of claim 1, wherein the test mode setting unit inputs a signal to the test enable terminal and inputs the signal to the reset terminal when the allocation of the test clock terminal and the L test terminals is completed, and generates test protocols so as to perform tests using the L test terminals when the test enable signal input to the test enable terminal is reversed.

3. The micro controller of claim 2, wherein the test mode setting unit stops the generation of the test protocols when a reset signal input to the reset terminal is reversed.

4. The micro controller of claim 1, wherein in the test mode setting unit, the test clock signal input to the test clock terminal is at least twice reversed from a logic low signal to a logic high signal and then is input to the M flip-flops, the test signal input via the test terminals is latched in the M flip-flops and maintains its value, and when the value latched in the M flip-flops is decoded by the decoder, $2^n$ test modes are set.

5. The micro controller of claim 1, wherein the test mode setting unit initializes the M flip-flops when a logic low signal is input to the test enable terminal and the reset terminal, and is activated so as to perform the test mode when the logic low signal input to the test enable terminal is changed to a logic high signal and the logic low signal input to the reset terminal is maintained in a logic low state.

6. A driving method of a micro controller comprising:
a test clock allocating step of allocating one of a plurality of input terminals to a test clock terminal;
a test terminal allocating step of allocating the remaining N, where N is an integer equal to or more than 1, input terminals of the plurality of input terminals to L, where L is an integer equal to or more than 1, test terminals;
a test mode preparing step of planning for entering a test mode by inputting a signal to a test enable terminal and inputting the signal to a reset terminal;
a test mode performing step of generating test protocols by reversing a test enable signal input to the test enable terminal and performing tests using the L test terminals; and
a test mode finishing step of stopping the generation of the test protocols by reversing a reset signal input to the reset terminal.

7. The driving method of claim 6, wherein the test mode performing step includes:
a signal reversing step of at least twice reversing a test clock signal input to the test clock terminal from a logic low signal to a logic high signal so as to be input to M, where M is an integer equal to or more than 2, flip-flops included in a test mode setting unit;
a data maintaining step of latching a test signal input via the test terminals in the M flip-flops and maintaining its value; and
a test mode setting step of decoding the value latched in the M flip-flops using a decoder included in the test mode setting unit, thereby setting $2^n$ test modes.

8. The driving method of claim 7, wherein in the test mode preparing step, the M flip-flops are initialized by inputting a logic low signal to the test enable terminal and the reset terminal, and
wherein in the test mode performing step, the logic low signal input to the test enable terminal is changed to a logic high signal and the logic low signal input to the reset terminal is maintained in a logic low state.

9. The driving method of claim 7, wherein the test clock terminal allocating step, the test terminal allocating step, the test mode preparing step, and the test mode performing step are performed when a signal input to the reset terminal is in a logic low signal state.

10. A display device comprising:
a display panel;
panel drivers configured to supply data signals and scan signals to the display panel; and
a micro controller configured to control the panel drivers, wherein the micro controller includes:
an input and output unit having a reset terminal, a plurality of input terminals, and a test enable terminal;
a test mode setting unit configured to allocate a first input terminal which is one of the plurality of input terminals to a test clock terminal and allocate the remaining N, where N is an integer equal to or more than 1, input terminals of the plurality of input terminals to L, where L is an integer equal to or more than 1, test terminals, in response to a signal output from the input and output unit; and a processor configured to control the input and output unit and the test mode setting unit, and wherein the test mode setting unit includes:

M, where M is an integer equal to or more than 2, flip-flops configured to receive a test clock signal from the first input terminal, receive a test signal from the N input terminals, and receive a test enable signal from the test enable terminal; and a decoder configured to decode a signal output from the M flip-flops and to allocate the N input terminals to the L test terminals.

11. The display device of claim 10, wherein the test mode setting unit inputs a signal to the test enable terminal and inputs the signal to the reset terminal when the allocation of the test clock terminal and the L test terminals is completed, and generates test protocols so as to perform tests using the L test terminals when the test enable signal input to the test enable terminal is reversed.

12. The display device of claim 11, wherein the test mode setting unit stops the generation of the test protocols when a reset signal input to the reset terminal is reversed.

13. The display device of claim 10, wherein in the test mode setting unit, the test clock signal input to the test clock terminal is at least twice reversed from a logic low signal to a logic high signal and then is input to the M flip-flops, the test signal input via the test terminals is latched in the M flip-flops and maintains its value, and when the value latched in the M flip-flops is decoded by the decoder, $2^n$ test modes are set.

14. The display device of claim 10, wherein the test mode setting unit initializes the M flip-flops when a logic low signal is input to the test enable terminal and the reset terminal, and is activated so as to perform the test mode when the logic low signal input to the test enable terminal is changed to a logic high signal and the logic low signal input to the reset terminal is maintained in a logic low state.

* * * * *